(12) United States Patent
Shilane (10) Patent No.: US 11,928,092 B2
(45) Date of Patent: Mar. 12, 2024

(54) WORD AWARE CONTENT DEFINED CHUNKING

(71) Applicant: EMC IP Holding Company LLC, Hopkinton, MA (US)

(72) Inventor: Philip N. Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 71 days.

(21) Appl. No.: 17/376,954

(22) Filed: Jul. 15, 2021

(65) Prior Publication Data

US 2023/0017347 A1   Jan. 19, 2023

(51) Int. Cl.
G06F 16/00 (2019.01)
G06F 16/215 (2019.01)
G06F 16/22 (2019.01)
G06F 16/242 (2019.01)

(52) U.S. Cl.
CPC ........ *G06F 16/215* (2019.01); *G06F 16/2255* (2019.01); *G06F 16/2425* (2019.01)

(58) Field of Classification Search
None
See application file for complete search history.

(56) References Cited

U.S. PATENT DOCUMENTS

| | | | |
|---|---|---|---|
| 8,370,309 B1* | 2/2013 | Ramarao | G06F 3/067 707/693 |
| 2013/0318051 A1* | 11/2013 | Kumar | G06F 16/137 707/692 |
| 2017/0024131 A1* | 1/2017 | Beale | G06F 12/1458 |

* cited by examiner

*Primary Examiner* — Bai D Vu
(74) *Attorney, Agent, or Firm* — Workman Nydegger (57) ABSTRACT

One example method includes, in a data buffer that includes one or more words and whitespaces, calculating a hash value of data in a window that is movable within the data buffer, comparing the hash value to a mask, and when the hash value matches the mask, identifying a position of the window in the data buffer as a chunk anchor position, searching for a whitespace nearest the chunk anchor position, and designating an offset of the whitespace as a segment boundary.

20 Claims, 6 Drawing Sheets

```
val = 0;
cand_val = 0;
cand_off = anchor_begin;
white_space_off = 0;

for (i = anchor_begin; i < anchor_end; i++) {
        val = (val << 1) ^ data[i];

if isspace(block->data[i]) {
           white_space_off = i;
        } if (val >= cand_val) {
           cand_val = val;

// if we are aligning to white space and found a white space in this segment
            if (ALIGN_WHITE_SPACE && white_space_off > 0){
               cand_off = white_space_off;
            }else{
               cand_off = i;
            }
        }
}
```

DELL TECHNOLOGIES IS COMMITTED TO TRANSFORMING BUSINESSES, SHAPING THE FUTURE OF INNOVATION AND DEVELOPING TECHNOLOGIES TO DRIVE HUMAN PROGRESS

FIG. 1A

DELL TECHNOLOGIES IS COMMITTED TO TRANSFORMING BUSINESSES, SHAPING THE FUTURE OF INN*OVATION AND DEVELOPING TECHNOLOGIES TO DRIVE HUMAN PROGRESS

FIG. 1B

DELL TECHNOLOGIES IS COMMITTED TO TRANSFORMING BUSINESSES, SHAPING THE FUTURE OF *INNOVATION AND DEVELOPING TECHNOLOGIES TO DRIVE HUMAN PROGRESS

FIG. 1C

```
val = 0;
cand_val = 0;
cand_off = anchor_begin;
white_space_off = 0;

for (i = anchor_begin; i < anchor_end; i++) {
        val = (val << 1) ^ data[i];

if isspace(block->data[i]) {
           white_space_off = i;
        } if (val >= cand_val) {
           cand_val = val;

// if we are aligning to white space and found a white space in this segment
           if (ALIGN_WHITE_SPACE && white_space_off > 0){
              cand_off = white_space_off;
           }else{
              cand_off = i;
           }
        }
}
```

|  | STANDARD | WHITESPACE-ALIGNED |
|---|---|---|
| DEDUPLICATION RATIO | 2.91 | 2.86 |
| DEDUPLICATION WITH LZ COMPRESSION | 5.28 | 5.30 |
| AVERAGE SEGMENT SIZE | 8565 | 8401 |

WORD AWARE CONTENT DEFINED CHUNKING

FIELD OF THE INVENTION

Embodiments of the present invention generally relate to chunking of data for deduplication purposes. More particularly, at least some embodiments of the invention relate to systems, hardware, software, computer-readable media, and methods for chunking data in a way that produces acceptable deduplication performance while also maintaining the integrity of textual elements so that text analytics may be performed on those textual elements.

BACKGROUND

Many data storage systems leverage deduplication as a technique to reduce storage capacity requirements and costs to the customer. In primary storage systems, deduplication ratios are often in the range of 2-6×, while backup storage systems may enable deduplication ratios of 20× or higher. Conventional deduplication processes, while effective for their purpose, can frustrate the performance of other processes concerning the data, such as text analytics for example.

Text analytics are the basis of numerous business analysis use cases, and it would be useful to be able to perform text analytics on the deduplicated data, rather than on the logical data that may be 2-6× or 20× larger than the deduplicated data. However, a significant challenge is that traditional techniques for forming segments, as part of a deduplication process, are unaware of word boundaries, so words may be split across segments during deduplication. This splitting of words in conventional deduplication processes may slow, or defeat, the performance of processes such as text analytics.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to chunking of data for deduplication purposes. More particularly, at least some embodiments of the invention relate to systems, hardware, software, computer-readable media, and methods for chunking data in a way that produces acceptable deduplication performance while also maintaining the integrity of textual elements so that text analytics may be performed on those textual elements. In some instances, embodiments of the invention may be implemented at an entity that performs data deduplication, such as a backup server or cloud storage site, for example.

In general, example embodiments of the invention may operate to create data segments, while respecting word boundaries. In this way, the resulting data segments are not only useful in deduplication processes, but may also enable the performance of processes such as text analytics regarding the segmented, or chunked, data, since the segment boundaries do not fall within a word.

In more detail, an embodiment of the invention may search, within a defined data range, for a candidate segment boundary. The search may involve the use of a window of a defined width that moves, bytewise in some embodiments, through the data range. The data range may be defined by a minimum segment size and a maximum segment size and may be bounded by an anchor start and an anchor end. Each time the window moves, a hash may be computed of the data within the window and, if a value of the hash exceeds a candidate value, a window offset, as defined by a position of an iterator 'i,' may be preliminarily identified as a candidate offset, that is, a possible position of a segment boundary. Before, or after, calculation of the hash, the new byte that comes into the window is checked to see if that byte is a whitespace, such as a space between words for example. If the byte is a whitespace, and if the computed hash exceeds the candidate value, the offset of the whitespace, rather than the window offset, may be set as the candidate offset. If the byte is not a whitespace, the window offset may be retained as the candidate offset. When the window has traversed the entire data range, the whitespace nearest the window offset that corresponds to the maximum hash value may be selected as a segment boundary.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that large datasets of text may be traversed relatively quickly to identify segment boundaries that do not fall within a word of the text. An embodiment may enable the performance of text based analyses since data segment boundaries are not defined within words of the text and entire words may thus be readily located in the dataset.

A. Overview

There are various content-defined chunking algorithms that produce variable-sized segments for deduplication purposes. The point of content-defined chunking is to create consistent chunks when there are edits such as insertions, deletions, and overwrites of data. The areas of modification will create new chunks, but the surrounding chunks will maintain their chunk boundaries since their content is unchanged.

One possible chunking approach involves searching a data range for a possible anchor position, that is, a possible segment boundary, where the beginning and ending of the range may be defined by minimum and maximum chunk sizes, such as 4 KB and 12 KB, respectively, for example. A hash value may be calculated for incorporating each byte of data. If the hash value is the highest seen so far, the offset of a window may be set as a candidate offset, that is, a possible segment boundary. At the end of the loop, that is, after the window has traversed the data range, the cand_off value may be selected as the beginning of the next segment, or end of the previous segment. This approach is advantageous in that it may be quick to compute and generates good quality segments for deduplication. However, the segments are defined without regard to whether or not segment boundaries fall within a word. That is, this approach is not whitespace aware and so defines segment boundaries based solely on deduplication performance considerations.

Another chunking approach is referred to as Rabin Content Defined chunking. In brief, the Rabin algorithm slides a window across the data calculating a hash value for the content within the window. The hash is defined in such a way that the hash can be updated efficiently for the byte leaving the window and the byte entering the window. If the hash value matches a mask, or predefined value, then that the window position defines the partition between two segments. The number of bits in the mask can be altered to generate segments of a desired average size. Like the previously described approach however, the Rabin method fails to take account of whitespace and words when defining segment boundaries.

In view of the present shortcomings, embodiments of the invention embrace, among other things, word aware content defined chunking methods. By creating segments in a way that respects word boundaries, various text analytics concerning the chunked data may be enabled and performed.

B. Aspects of Some Example Embodiments

Figure 1A:
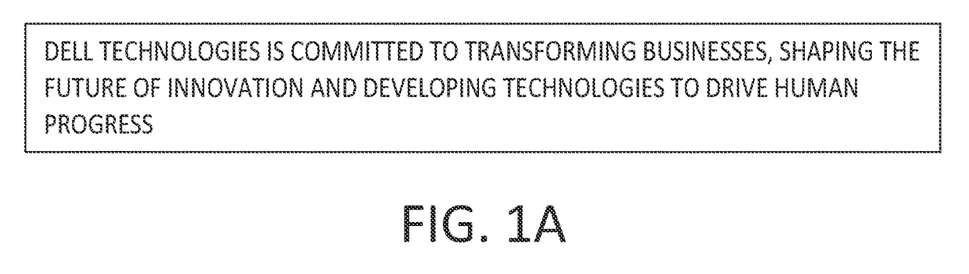
FIGS. 1a, 1b, and 1c, disclose example text and associated segment boundaries.
Figure 1B:
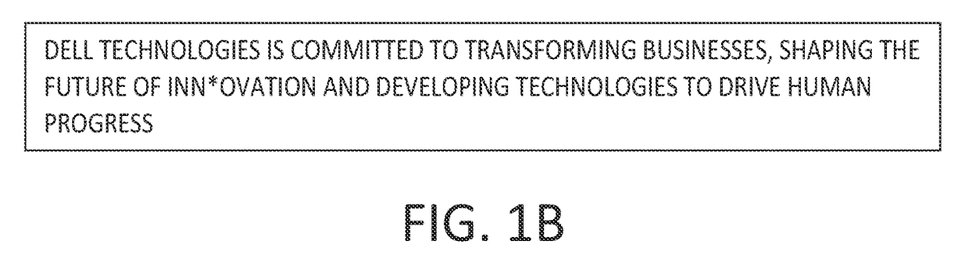
Figure 1C:
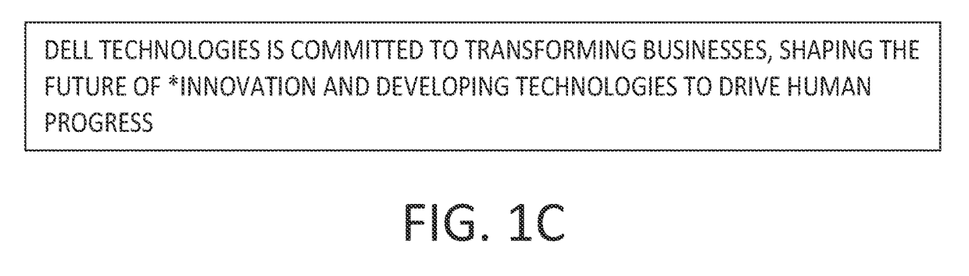

With reference now to FIGS. 1a, 1b, and 1c, details are provided concerning various aspects of example embodiments that are directed to whitespace aware contend defined data chunking (CDC) processes. The chunks, or segments, defined by example embodiments may be well suited for deduplication as well.

Note that as used herein, 'whitespace' includes, but is not necessarily limited to, blank spaces between words, newlines, and any byte values that are not part of a word. Other examples of whitespace may include punctuation. In some instances, segment boundaries may not be permitted within the digits of a number. Further, certain whitespaces may, in some embodiments, be prevented from serving as segment boundaries, such as whitespaces within a credit card number for example. For example, the credit card number '1234 567890 12345' includes two whitespaces, namely, between 4 and the first 5, and between 0 and the second 1. If segment boundaries were permitted at those locations, a text search for that string might not turn up the credit card number, or at least may not do so readily.

With reference now to the example of FIG. 1a, a text string is indicated that may be the subject of chunking. Because conventional approaches to chunking are agnostic to whitespace, the boundary point between two segments could be in the middle of a word. In fact, in the illustrative example of FIG. 1a, the boundary is likely to be within a word since the number of whitespaces is much smaller than the number of non-whitespace characters in that text.

For example, and with reference to FIG. 1b, suppose the segment boundary is within "innovation," as indicated by a star (*). While this may be a reasonable result if the data is being chunked simply for use in a conventional deduplication processes, this approach introduces challenges to the performance of text analytics since there will likely be frequent partial words at the beginning and ending positions of segments. In the illustrative case of FIG. 1b, the partial words would be "inn" and "ovation." In order to count term frequency, or to simply locate the term "innovation," an algorithm would have to search across segment boundaries using information about the logical sequence of segments, which implies a scan of the logical data that would be time consuming and not conducive to efficient and effective performance of text based analytics. Thus, it is desirable to avoid a result such as is illustrated in FIG. 1b.

Figure 2:
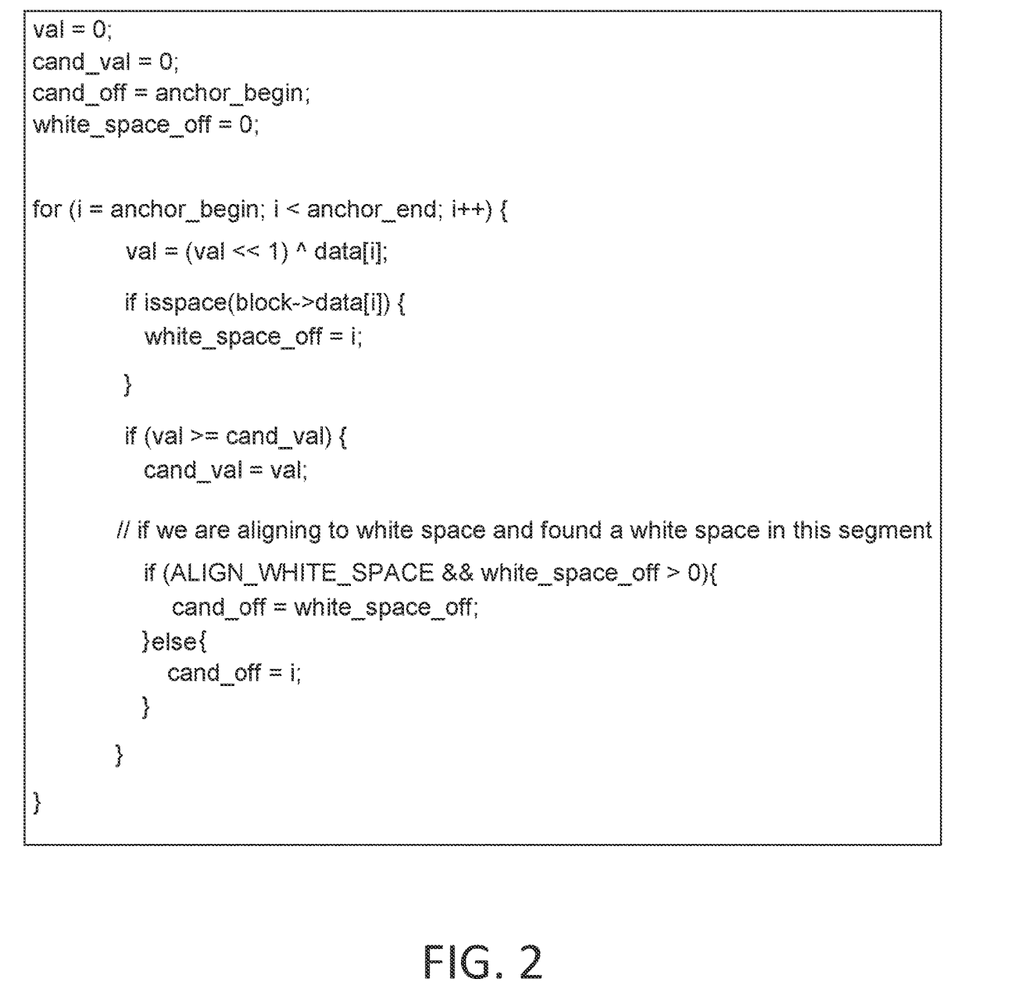
FIG. 2 discloses an example algorithm for word aware content defined data chunking according to some embodiments.

Rather, in order to enable performance of text analytics, embodiments of the invention may serve to create an anchor point in a whitespace area so as to avoid splitting words at segment boundaries. With reference now to FIG. 1c and FIG. 2, it can be seen in the example algorithm of FIG. 2 that as a window moves bytewise across the data in a specified range, each new byte that enters the window is checked to see if it is a whitespace, as indicated by the 'isspace' function in FIG. 2. If so, the white_space_off value is set, that is, the location of the whitespace, rather than the window offset, is set as the candidate offset. Note that as used herein, the window offset refers to the position of the iterator 'i.' Then, if the hash value is the maximal value seen so far, that is, in FIG. 2, val>=cand_val, instead of retaining the window offset, we retain the position, or offset, of the last whitespace seen, which could have been before the window. On the other hand, if the byte is not a whitespace, the window offset may be retained as the candidate offset. When the window has traversed the entire data range, the whitespace nearest the window offset that corresponds to the maximum hash value may be selected as a segment boundary. As shown in the example of FIG. 1c, this approach may result in placement of the segment boundary in the whitespace between the word 'of' and the word 'innovation.' Because the segment boundary does not fall within a word, in the example of FIG. 1c, it may be relatively easier to perform a textual analysis of the sample text in the text box.

Figure 3A:
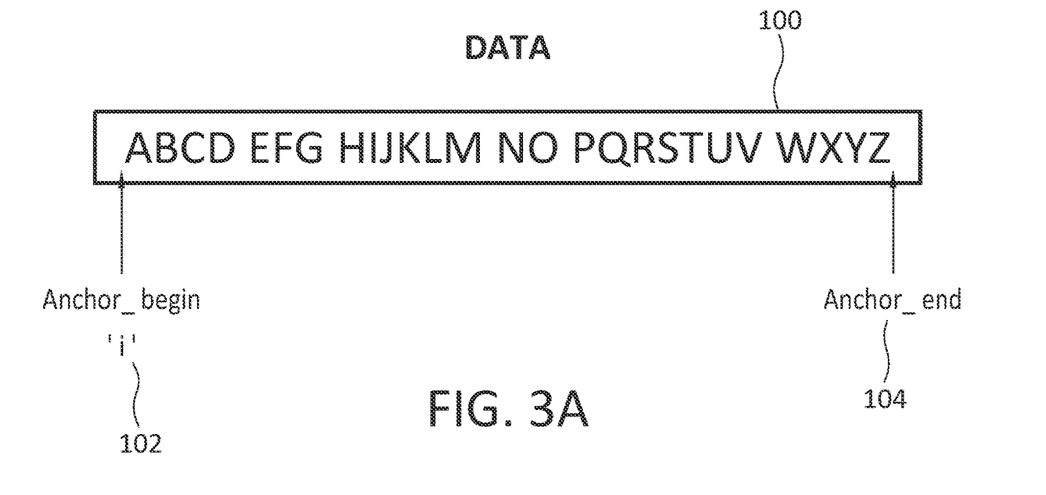
FIGS. 3a, 3b, 3c, 3d, and 3e, disclose aspects of an example method for identifying segment boundaries.

With reference next to FIGS. 3a, 3b, 3c, 3d, and 3e, further details are provided concerning aspects of some example embodiments of the invention. As shown in those Figures, an example 'Data' buffer 100 includes the letters A-Z, along with various whitespaces between D and E, between G and H, between M and N, between O and P, and between V and W. The letters are presented by way of example and any or all of the letter groupings in a data buffer may take the form of actual words. In general, a size of a buffer may be delimited by a minimum chunk size, and a maximum chunk size. The boundaries of the buffer may be indicated by anchor points, such as anchor_begin 102 and anchor_end 104. An iterator 106 may be provided whose location in the data buffer 100 is denoted at 'i.' In general, the iterator 106 may move from left to right, and/or from right to left, through the data buffer 100. In FIG. 3*a*, the iterator 106 has an initial position 'i' at the anchor_begin 102 position before traversal of the data buffer 100 begins. As shown, the position 'i' of the iterator 106 may be at the rightmost end of the window 108. Thus, as the iterator 106 moves from left to right in the data buffer 100, it points to the rightmost byte within the window 108 considered within the hash.

Figure 3B:
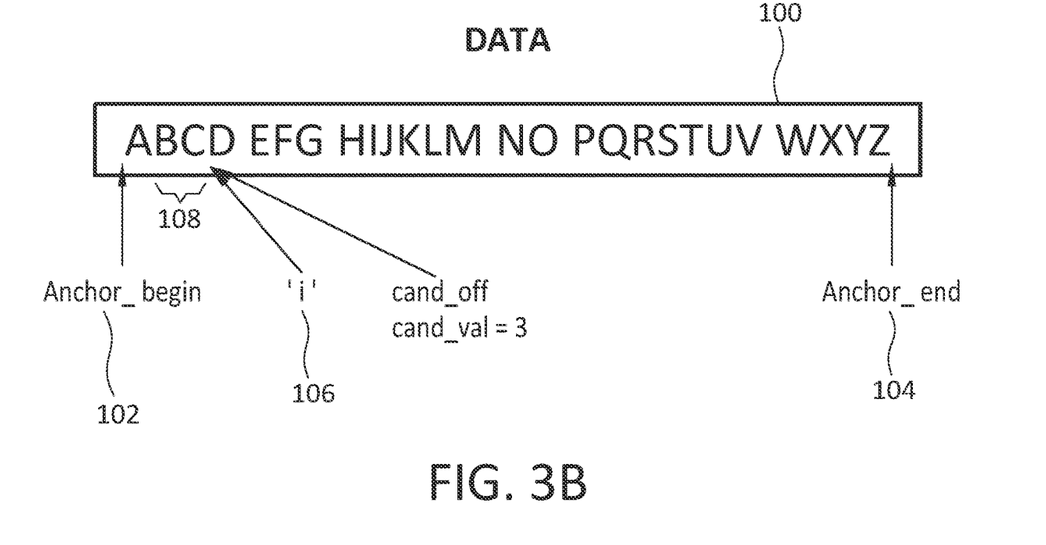

In FIG. 3*b*, it can be seen that a hash value '3' at a candidate segment boundary position, that is, the value cand_val, is larger than any previous cand_val, so the offset at that position, cand_off, may be recorded as equal the position 'i.' As also shown in FIG. 3*b*, the window 108 has not yet encountered any whitespace.

Figure 3C:
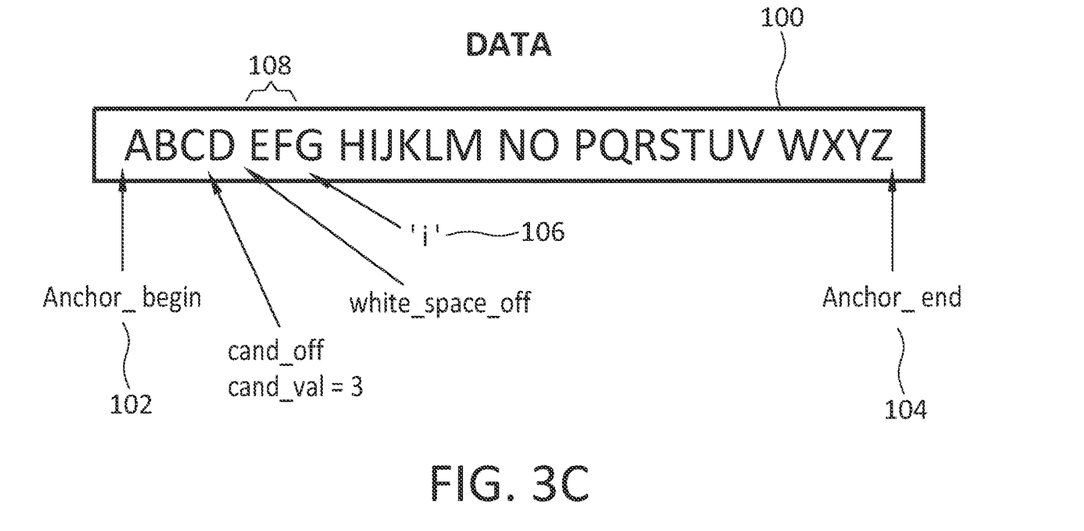

Turning next to FIG. 3*c*, it can be seen that the window 108 has moved further to the right in the data buffer 100 and encountered a whitespace between the characters 'D' and 'E.' However, because the hash value, or cand_val, at the new window position has also been calculated as 3, which is not larger than the previous cand_value of 3 noted in FIG. 3*b*, the cand_off is unchanged from FIG. 3*b*.

Figure 3D:
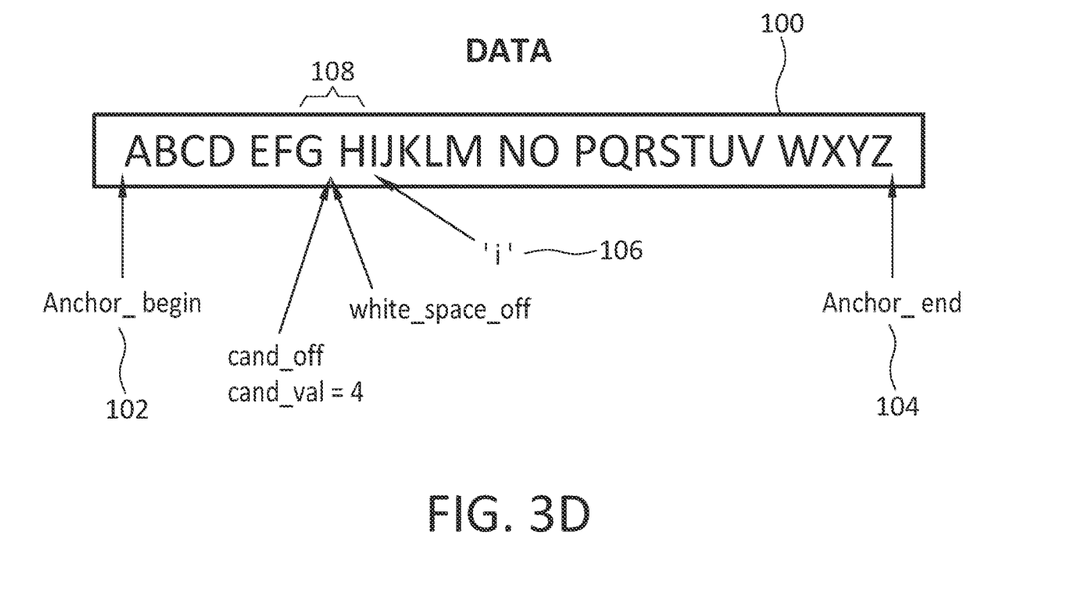

However, in FIG. 3*d*, a hash value, or cand_val, at the new window position has been calculated as 4, which is the largest value calculated thus far in the traversal of the data buffer 100. As well, another whitespace has been encountered between the characters 'G' and 'H' and, accordingly, the candidate offset is set to the offset of that whitespace, that is, cand_off is set to white_space_off. That is, the relatively higher value of the hash suggests that the candidate offset position where the hash value is calculated may be a good segment boundary, but since segment boundaries within words should be avoided, the candidate offset position is set to the offset of the whitespace, which may serve as an acceptable segment boundary since it is positioned between the strings 'EFG' and 'HIJKLM.'

Figure 3E:
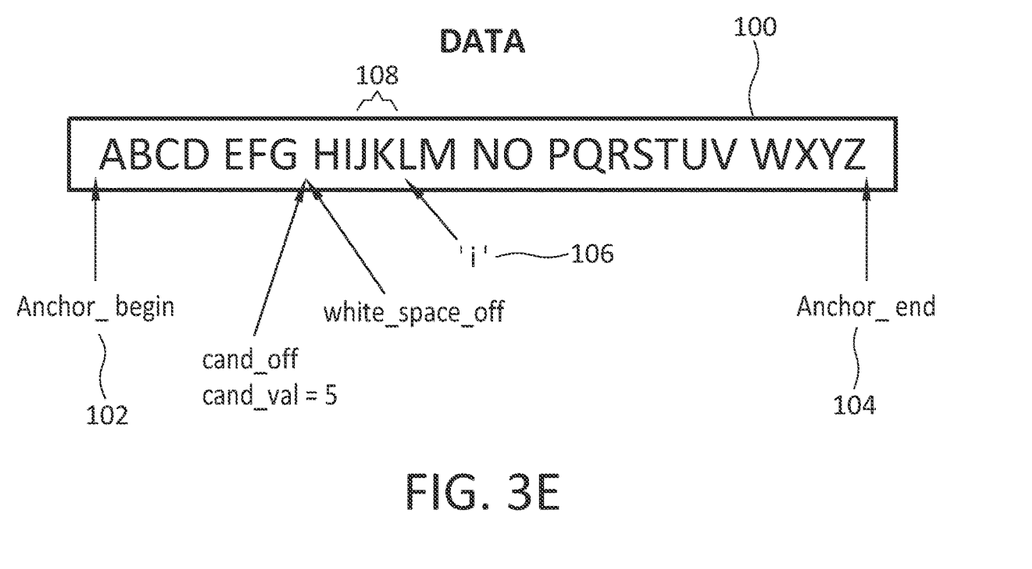

Finally, as shown in FIG. 3*e*, a higher cand_val of 5 has been calculated but no further whitespaces have been encountered, so cand_off remains pointing at the last whitespace, that is, cand_off=the white_space_off that was identified in FIG. 3*d*. If the window 108 continues to move to the right in the data buffer 100, and no hash value greater than 5 is calculated, white_space_off will point to the space between M and N as a possible segment boundary. Cand_off will only change if a higher cand_val is calculated. Note that white_space_off may continue being updated every time a whitespace is identified. The cand_off may only be updated when cand_val increases and may point to the current value of white_space_off, which is always less than or equal to the iterator i. The process described in connection with FIGS. 3*a*-3*e* may continue until the entire data buffer 100 is traversed by the window 108.

C. Alternative Embodiments, and Sample Experimental Results

With the discussion of the Figures in view, it will be appreciated that various modifications may be made to define still further embodiments of the invention. For example, a conventional anchoring algorithm may be employed to identify one or more segment boundaries, which may be located within a word. After these segment boundaries have been preliminarily identified, a further search of the data buffer may be performed, to the left and/or the right of a segment boundary to identify a whitespace, and the whitespace thus identified may then be set as a segment boundary. It is noted that minimum and maximum segment sizes can still be enforced in this variation. Thus, the nearest whitespace could make a segment either too small or too large. In that case, a whitespace in the opposite direction could be found, or the whitespace can be ignored for this segment and the normal anchoring position used.

A modification similar to that just described may be applied to other content-defined chunking algorithms, such as the Rabin content-defined chunking. For the Rabin algorithm, when the window position matches the mask value, a search may be performed to the left and/or right of the window position to find the nearest whitespace, which may then be designated a segment boundary. Alternatively, the nearest whitespace location may have been maintained while processing the Rabin algorithm.

Embodiments of the invention may be specifically configured for use with for text documents, or at least documents that include some text, and may not change the chunking for binary data and may thus be unlikely to impair chunk formation. Some embodiments may be selectively activated for specific data sets that are known to mostly consist of text, or other strings that may be the subject of analyses.

Figure 4:
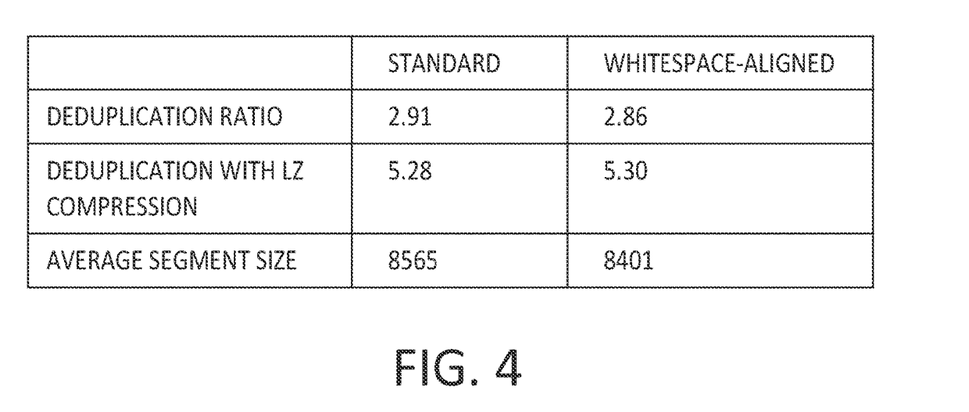
FIG. 4 discloses some example experimental results.

With reference now to FIG. 4, some example experimental results are disclosed. In that example, a standard chunking algorithm was run on a backup dataset that was approximately 13 GB in size, and much of the content of which comprised source code. As well, an algorithm according to some embodiments was also run on the same backup dataset. The table in FIG. 4 summarizes various aspects of this experiment.

As shown there, the deduplication ratio for the standard chunking algorithm was 2.91×, and 2.86× for the whitespace-aligned algorithm according to some embodiments, indicating a small loss in deduplication. The deduplication ratio is calculated as the original logical size of the data divided by the size after deduplication takes place. Higher values indicate more duplicates were identified. The second row of the table shows the impact of LZ (local) compression along with deduplication, and the standard chunking algorithm had a space savings of 5.28×, while the whitespace-aligned algorithm generated a space savings of 5.30×. As the information in the table indicates, a whitespace-aligned chunking algorithm according to some embodiments produces similar space savings as the standard comparative standard chunking algorithm. The average segment size was smaller since the example version of the whitespace-aligned algorithm used in the experiment only searched to the left of the anchor point, whereas searching both to the left and right likely would have resulted in a similar average segment size when compared with segment sizes generated by the standard chunking algorithm.

The end result of the whitespace-aligned chunking algorithm according to some example embodiments is that not only does that whitespace-aligned chunking algorithm produce acceptable deduplication results, but it does so while also producing segments that are whitespace aligned, which supports text analytics since words are not split across segments while maintaining deduplication ratios. Put another way, the deduplication performance is not materially impaired by the implementation of whitespace alignment.

D. Example Methods

It is noted with respect to the example method collectively disclosed by FIGS. 3*a*-3*e*, and the other methods disclosed herein, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: moving a window from a first position in a data buffer to a second position in the data buffer, and the data buffer includes one or more words; calculating a hash value of data in the window when the window is in the second position; checking a byte that has entered the window, as a result of the movement of the window from the first position to the second position, to determine whether the byte is whitespace; and when the hash value is the greatest hash value seen up to a current position of the window, and when the byte is determined to be whitespace, setting a candidate offset to a whitespace offset, and the candidate offset denotes a possible segment boundary that does not fall within any word in the data buffer.

Embodiment 2. The method as recited in embodiment 1, wherein when the hash value is not the greatest hash value seen up to the position of the window, and the byte is determined not to be whitespace, setting a candidate offset to a window offset.

Embodiment 3. The method as recited in any of embodiments 1-2, wherein when the hash value is the greatest hash value seen up to the position of the window, and the byte is determined not to be whitespace, setting a candidate offset to a window offset.

Embodiment 4. The method as recited in any of embodiments 1-3, wherein when the candidate offset is not set to a whitespace offset, identifying a closest whitespace to the candidate offset and designating the closest whitespace as a segment boundary.

Embodiment 5. The method as recited in any of embodiments 1-4, wherein the window movement is either right to left, or left to right, in the data buffer.

Embodiment 6. The method as recited in any of embodiments 1-5, wherein when designation of the whitespace offset as a segment boundary violates a maximum or minimum segment size, searching for an alternative whitespace as a segment boundary.

Embodiment 7. A method, comprising: in a data buffer that includes one or more words and whitespaces, calculating a hash value of data in a window that is movable within the data buffer; comparing the hash value to a mask, and when the hash value matches the mask, identifying a position of the window in the data buffer as a chunk anchor position; searching for a whitespace nearest the chunk anchor position; and designating an offset of the whitespace as a segment boundary.

Embodiment 8. The method as recited in embodiment 7, wherein the searching comprises searching the data buffer from right to left, and/or left to right, to locate the whitespace.

Embodiment 9. The method as recited in any of embodiments 7-8, wherein when designation of the whitespace offset as a segment boundary violates a maximum or minimum segment size, searching for an alternative whitespace as a segment boundary.

Embodiment 10. The method as recited in any of embodiments 7-9, wherein the chunk anchor position falls within one of the words of the data buffer.

Embodiment 11. The method as recited in any of embodiments 7-10, wherein the data buffer is bounded by a minimum segment size and a maximum segment size.

Embodiment 12. The method as recited in any of embodiments 7-11, wherein movement of the window within the data buffer is a bytewise movement.

Embodiment 13. The method as recited in any of embodiments 7-12, wherein the segment boundary is a beginning of a segment, or an end of a segment.

Embodiment 14. A method for performing any of the operations, methods, or processes, or any portion of any of these, disclosed herein.

Embodiment 15. A non-transitory storage medium having stored therein instructions that are executable by one or more hardware processors to perform operations comprising the operations of any one or more of embodiments 1-14.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads.

While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
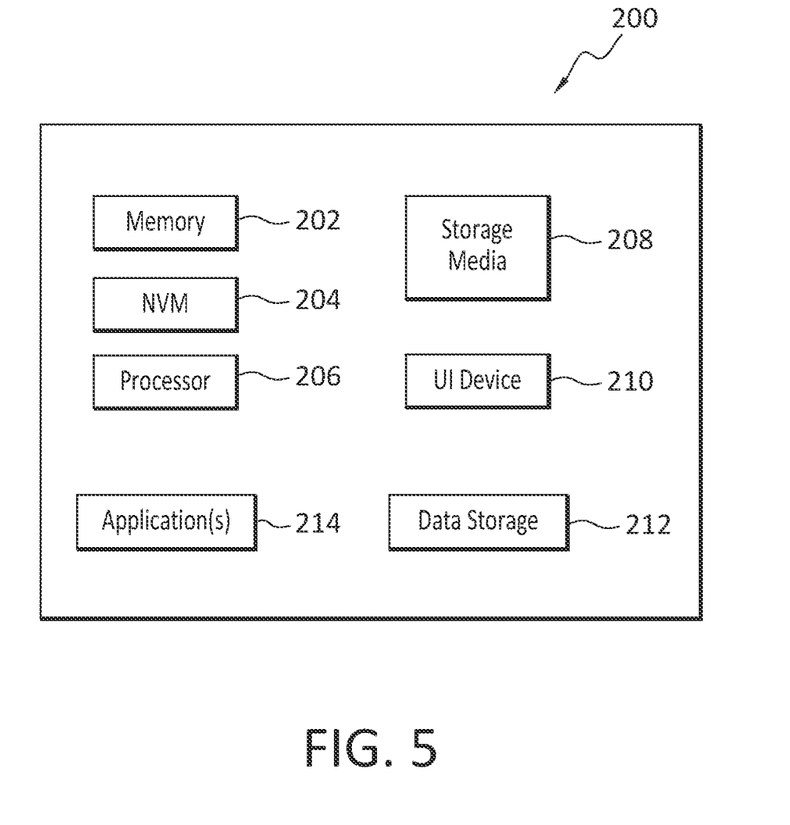
FIG. 5 discloses an example computing entity operable to perform any of the disclosed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example denoted at 200. As well, where any of the aforementioned elements comprise or consist of a virtual machine (VM), that VM may constitute a virtualization of any combination of the physical components disclosed in FIG. 5.

In the example of FIG. 5, the physical computing device 200 includes a memory 202 which may include one, some, or all, of random access memory (RAM), non-volatile memory (NVM) 204 such as NVRAM for example, read-only memory (ROM), and persistent memory, one or more hardware processors 206, non-transitory storage media 208, UI device 210, and data storage 212. One or more of the memory components 202 of the physical computing device 200 may take the form of solid state device (SSD) storage. As well, one or more applications 214 may be provided that comprise instructions executable by one or more hardware processors 206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
moving a window from a first position in a data buffer to a second position in the data buffer, and the data buffer includes one or more words;
calculating a hash value of data in the window when the window is in the second position;
checking a byte that has entered the window, as a result of a movement of the window from the first position to the second position, to determine whether the byte is whitespace; and
when the hash value is a greatest hash value seen up to a current position of the window, and when the byte is determined to be whitespace, setting a candidate offset to a whitespace offset, and the candidate offset denotes a possible segment boundary that does not fall within any word in the data buffer.

2. The method as recited in claim 1, wherein when the hash value is not the greatest hash value seen up to the position of the window, and the byte is determined not to be whitespace, setting a candidate offset to a window offset.

3. The method as recited in claim 1, wherein when the hash value is the greatest hash value seen up to the position of the window, and the byte is determined not to be whitespace, setting a candidate offset to a window offset.

4. The method as recited in claim 1, wherein when the candidate offset is not set to a whitespace offset, identifying a closest whitespace to the candidate offset and designating the closest whitespace as a segment boundary.

5. The method as recited in claim 1, wherein the window movement is either right to left, or left to right, in the data buffer.

6. The method as recited in claim 1, wherein when designation of the whitespace offset as a segment boundary violates a maximum or minimum segment size, searching for an alternative whitespace as a segment boundary.

7. A method, comprising:
in a data buffer that includes one or more words and whitespaces, calculating a hash value of data in a window that is movable within the data buffer;
comparing the hash value to a mask, and when the hash value matches the mask, identifying a position of the window in the data buffer as a chunk anchor position;
searching for a whitespace nearest the chunk anchor position; and designating an offset of the whitespace as a segment boundary to ensure that the segment boundary does not fall within any of the words in the data buffer.

8. The method as recited in claim 7, wherein the searching comprises searching the data buffer by traversing a portion of the data buffer to locate the whitespace.

9. The method as recited in claim 7, wherein when designation of the whitespace offset as a segment boundary violates a maximum or minimum segment size, searching for an alternative whitespace as a segment boundary.

10. The method as recited in claim 7, wherein the chunk anchor position falls within one of the words of the data buffer.

11. The method as recited in claim 7, wherein the data buffer is bounded by a minimum segment size and a maximum segment size.

12. The method as recited in claim 7, wherein movement of the window within the data buffer is a bytewise movement.

13. The method as recited in claim 7, wherein the segment boundary is a beginning of a segment, or an end of a segment.

14. A non-transitory storage medium having stored therein instructions that are executable by one or more hardware processors to perform operations comprising:

in a data buffer that includes one or more words and whitespaces, calculating a hash value of data in a window that is movable within the data buffer;

comparing the hash value to a mask, and when the hash value matches the mask, identifying a position of the window in the data buffer as a chunk anchor position;

searching for a whitespace nearest the chunk anchor position; and designating an offset of the whitespace as a segment boundary to ensure that the segment boundary does not fall within any of the words in the data buffer.

15. A non-transitory storage medium as recited in claim 14, wherein the searching comprises searching the data buffer by traversing a portion of the data buffer to locate the whitespace.

16. A non-transitory storage medium as recited in claim 14, wherein when designation of the whitespace offset as a segment boundary violates a maximum or minimum segment size, searching for an alternative whitespace as a segment boundary.

17. A non-transitory storage medium as recited in claim 14, wherein the chunk anchor position falls within one of the words of the data buffer.

18. A non-transitory storage medium as recited in claim 14, wherein the data buffer is bounded by a minimum segment size and a maximum segment size.

19. A non-transitory storage medium as recited in claim 14, wherein movement of the window within the data buffer is bytewise movement.

20. A non-transitory storage medium as recited in claim 14, wherein the segment boundary is a beginning of a segment, or an end of a segment.

\* \* \* \* \*